Dec. 10, 1946.   F. RIEBER   2,412,536
MECHANICALLY TUNED OSCILLATOR
Filed Jan. 29, 1944

INVENTOR.
FRANK RIEBER
BY
Willis B Rice
ATTY.

Patented Dec. 10, 1946

2,412,536

UNITED STATES PATENT OFFICE 2,412,536

MECHANICALLY TUNED OSCILLATOR

Frank Rieber, New York, N. Y., assignor to Interval Instruments, Inc., New York, N. Y., a corporation of New York Application January 29, 1944, Serial No. 520,204

9 Claims. (Cl. 250—36)

This invention relates to a device for readily measuring the frequency of an alternating current with great accuracy.

In my copending application for transducers filed of even date herewith and bearing Serial No. 520,196, I have disclosed a transducer in which the period of vibration of a stretched wire is so coordinated with an alternating current that the frequency of the alternating current may be determined by measurement of the tension upon the wire. In that application the tension upon the wire is shown adjustable by means of a cam having a dial such that the reading on the dial may be used directly to indicate the frequency of the current.

In accordance with the present invention, the same principles are utilized in measuring the frequency of an alternating current but in the instant case a different method of varying the tension upon the wire is employed.

It is an object of this invention to provide a frequency meter of great simplicity of construction and operation which will be rugged and inexpensive, and yet very sensitive.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawing, in which.

Figure 1:
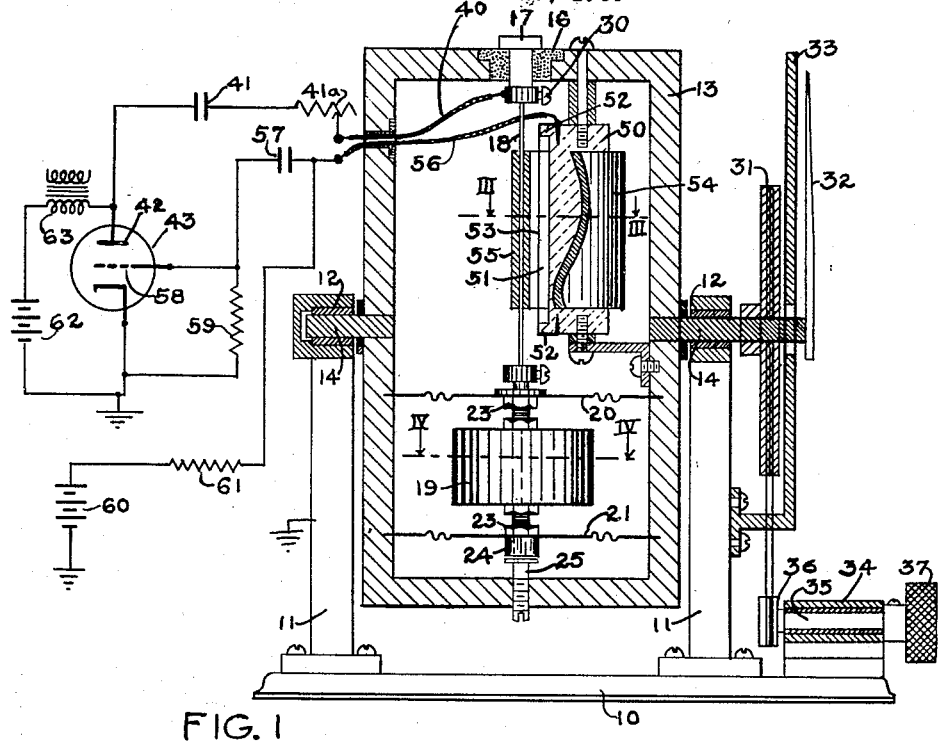
Fig. 1 is an elevation, partly in section, of an apparatus embodying this invention, connected to a circuit forming a part of the apparatus.
Figure 3:
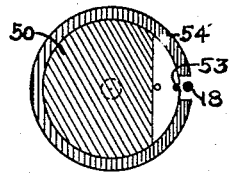
Fig. 3 is a section on line 33 of Fig. 1.
Figure 4:
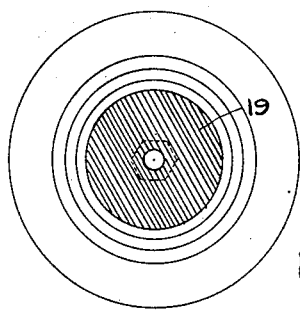
Fig. 4 is a section on the line 4—4 of Fig. 1.
Figure 2:
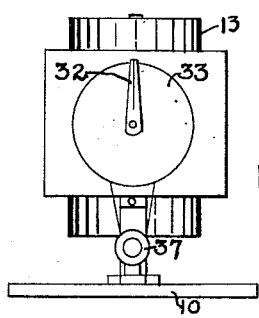
Fig. 2 is a side elevation thereof to a reduced scale.

In the drawing the numeral 10 designates a base having a pair of uprights 11 carrying bearings 12, in which is pivoted a frame 13 mounted on trunnions 14. The frame 13 may take the form of a closed cylindrical casing, although it will be understood that this closed casing is severable at some point in order to afford easy access to the interior for construction and repair. Mounted in the center of one end of the shell is an insulator 16 carrying a hollow stud 17, in which is fastened one end of a wire 18, the other end of the wire 18 being connected to a weight 19 in the lower portion of the shell.

Above and also below the weight 19 there is provided a diaphragm 20 and 21. The weight 19 is provided with studs 23 and 23 by which it is connected to the center of the diaphragms 20 and 21. These diaphragms are quite flexible. They may, however, be so designed as to impose an initial tension on the wire 18, as well as support the weight 19, and they are intended to be such as to offer no restraint to the movement of the weight 19 along the axis of the shell, so long as that movement does not exceed a small amount.

The lower end of the lower stud 23 is provided with a nut 24 which may be arranged to engage an adjustable screw 25 to limit the stretching of the wire 18 too far, regardless of the condition to which it is subjected.

With the device as above constructed in originally adjusting the device, it will be clear that when the device stands with the weight 19 at the top and with an extending end of the wire 18 protruding through the stud 17, we may grasp the extending end of the wire 18 and place upon it a weight corresponding to the desired initial tension thereof, and then clamp it with a screw 30. Thereafter if the shell 13 is turned through any angle from the inverted vertical just described, the tension on the wire will gradually increase because the pull of the weight 19 varies with the cosine of the angle through which it is turned, until the position shown in Fig. 1 is attained, in which position the weight 19 will be added to the tension instead of being subtracted from it.

Mounted upon the end of the shaft 14 upon one side is a pulley 31, and mounted upon its outer end is an indicating hand 32, and between the pulley and the indicating hand is a fixed dial 33. Mounted below the pulley 31 upon the base is a bearing 34 carrying a shaft 35, on one end of which is a small pulley 36 in alignment with the pulley 31, and connected to it by a belt. Mounted upon the other end of the shaft 35 is a knurled head 37.

The lower end of the wire 18 is electrically connected to the shell 20, which is itself electrically connected to ground. The upper end of the wire 18 is connected through a lead 40, a condenser 41, and a feed back control resistance 41a, with the plate circuit 42 of an oscillator tube 43.

Mounted within the shell 13 is an insulator 50 of a height substantially equal to the vibrating portion of the wire 18, and this insulator is cut away through its central portion, as shown at 51, leaving two arms 52, one at top and one at bottom, between which is stretched an electrode 53; while a permanent magnet 54 surrounding the member 50 has its poles disposed on opposite sides of the wire 18, so that its lines of force move transverse to the plane defined by the wire 18 and the electrode 53.

The electrode 53 is electrically connected by a wire 56 through a condenser 57 to the grid 58 of the vacuum tube above referred to, while means are provided to maintain a proper potential upon the grid shown in the form of a grid leak resistance 59. A potential is imposed upon the electrode 53 by means of a battery 60 acting through a resistance 61; and a battery 62 acting through a translating device 63 supplies potential to the plate 42. With the construction above outlined, it will be seen that as we turn the knurled knob 37, we vary the effect of the weight 19 upon the tension of the wire 18, and thus vary its frequency, according to the law that the tension at $L\phi$ from inverted position = initial tension − weight 19 and associated parts $X \cos \phi$.

When this device is connected to the oscillating circuit above described, the calibration of the instrument will at all times indicate the frequency of the current maintained by the oscillator.

If, however, it is desired to measure the frequency of an incoming current, the feed back circuit from the oscillator may be omitted and the incoming current may be fed through the vibratable wire. The incoming signal, however, will have no effect upon the vibrating wire until the latter has been brought in tune with it. The instrument may then be turned until the frequency of the wire is tuned to the incoming frequency, which will start the wire in vibration. The vibration of the wire will thereupon start the tube 43 in oscillation and this point will be instantly recognizable by the response of the instrument connected to the translating device 63 which is used in this specification as typically embodying any use to which the alternating current may be placed either to operate a visual meter or to perform some electrical function or otherwise. These specific uses are ancillary to but form no part of the present invention. The instrument calibration will then read the frequency directly.

When the instrument is used in this manner, it serves to amplify any component of the incoming wave that is in tune with the setting of the instrument.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device of the character described comprising, in combination, a frame mounted for rotation about a horizontal axis, a wire attached to said frame having its other end connected to a weight, means supported by said frame for holding said wire and weight axially disposed in said frame, an oscillator including means controlled by the vibration of said wire to maintain said wire in vibration, and means to measure the angle through which said frame is turned.

2. A device of the character described comprising, in combination, a frame mounted for rotation about a horizontal axis, a wire attached to said frame having its other end connected to a weight, means supported by said frame for holding said wire and weight axially disposed in said frame, including means for imposing tension upon said wire, even when said frame is rotated to bring said weight above said wire, an oscillator including means controlled by the vibration of said wire to maintain said wire in vibration, and means to measure the angle through which said frame is turned.

3. A device of the character described comprising, in combination, a wire, a magnet disposed to have its lines of force transverse to said wire, an oscillator actuated by the movement of said wire and connected to maintain said wire in vibration, a frame having a diaphragm therein, said wire having one end connected to said frame and the other end to said diaphragm with said wire axially disposed in said frame, a weight carried by said diaphragm, and means for indicating the angle through which said frame is turned.

4. A device of the character described comprising, in combination, a frame, an upper and lower diaphragm extending across said frame, a wire stretched across between said frame and said upper diaphragm and disposed axially in said frame, a weight connected between said diaphragms, said frame being rotatable about a horizontal axis, means for measuring the degree of rotation thereof, an oscillating system including means responsive to the vibration of the wire for determining the period of oscillation, means supplied by said oscillator for passing current through the wire, and a permanent magnet supported by said frame having its poles disposed on opposite sides of said wire.

5. A device in accordance with claim 1, in which the oscillator includes an electrode parallel to the wire connected to the grid of the oscillator, means for imposing electric tension on said electrode, a magnet disposed with its poles on opposite sides of said wire, and a connection for feeding current through said wire from said oscillator.

6. A device in accordance with claim 2, in which the oscillator includes an electrode parallel to the wire connected to the grid of the oscillator, means for imposing electric tension on said electrode, a magnet disposed with its poles on opposite sides of said wire, and a connection for feeding current through said wire from said oscillator.

7. A device in accordance with claim 3, in which the oscillator includes an electrode parallel to the wire and means for imposing electric tension on said electrode, said electrode being connected to the grid of the oscillator, and connections for feeding current from said oscillator through said wire.

8. A device in accordance with claim 4, in which the oscillator includes an electrode parallel to the wire and means for imposing electric tension on said electrode, said electrode being connected to the grid of the oscillator, and connections for feeding current from said oscillator through said wire.

9. A device of the character described comprising, in combination, a frame mounted for rotation about a horizontal axis, a wire attached to said frame having its other end connected to a weight, means supported by said frame for holding said wire and weight diametrically disposed in said frame, means for feeding a current through said wire, and a magnet disposed to cause its lines of force to pass transverse to said wire.

FRANK RIEBER.